United States Patent [19]

Massey

[11] 4,035,932

[45] July 19, 1977

[54] EDUCATIONAL GAME

[76] Inventor: Janet E. Massey, Rte. 1, Box 68, Burlington, N.C. 27215

[21] Appl. No.: 629,008

[22] Filed: Nov. 5, 1975

[51] Int. Cl.² .......................... G09B 1/04; A63F 3/00
[52] U.S. Cl. ............................... 35/35 D; 273/134 AD
[58] Field of Search .......... 273/131 G, 135 R, 135 D, 273/135 AC, 136 W, 152.31, 152.7 R, 134 AB, 134 AD, 134 AC, 134 C, 130 R, 130 E; 35/31 R, 31 C, 31 D, 31 F, 31 G, 35 R, 35 D, 35 H, 35 J

[56] References Cited

U.S. PATENT DOCUMENTS

| | | | |
|---|---|---|---|
| 1,595,906 | 8/1926 | Miller | 273/134 AD |
| 1,635,734 | 7/1927 | Ziegler | 273/134 AC |
| 2,970,840 | 2/1961 | Richie | 273/134 AD |
| 3,582,080 | 6/1971 | Schick | 273/134 AD |

Primary Examiner—Richard J. Apley

[57] ABSTRACT

An educational game for school age children designed to teach a variety of essential skills. Players move competitively along a designated path on a playing board according to their correct or incorrect response to a selected one of a plurality of questions dealing with rules of sentence punctuation or any other subject. Each landing area on the designated path includes a plurality of geometric shapes of different colors arranged in a row extending transversely to the path. Because of the unique design of the designated path on the playing board, the game also teaches children to identify colors and geometric shapes, to count, and provides experience in following given directions.

3 Claims, 6 Drawing Figures

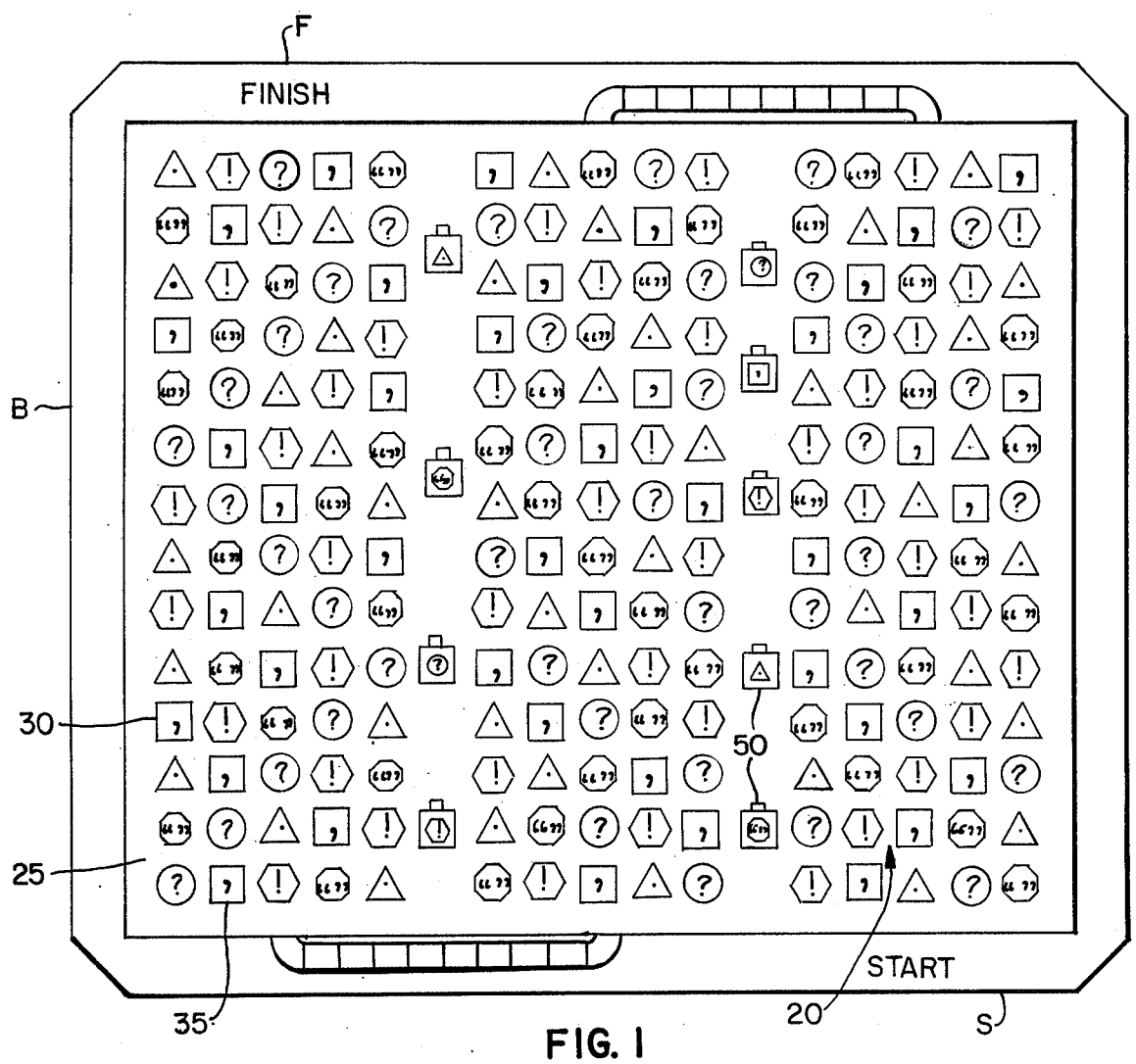
FIG. 1
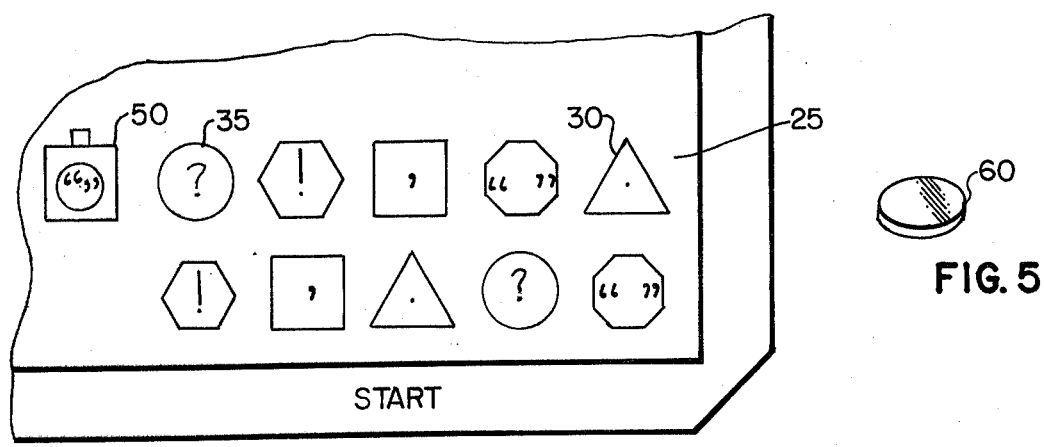
FIG. 2
FIG. 5

4,035,932

EDUCATIONAL GAME

BACKGROUND OF THE INVENTION

Those involved in an educational system continually attempt to develop new methods of teaching, and it is an acknowledged principle that the most successful methods results from active, willing student participation. Active participation has, in the past, been on the basis of learning exercises in a formal classroom situation or assignments outside the classroom. During recent years, a trend has developed in which entertaining devices, i.e. toys and games, are used as educational tools. This trend has proven to be quite successful in that children can learn a variety of skills in a game type atmosphere. Now, as a complement to the more formalized techniques of classroom teaching, games and toys may be utilized that will provide entertainment along with educational benefit.

With these educational benefits in mind, during recent years many games and other toys have been developed to increase skill in a variety of activities for children of many age groups.

SUMMARY OF THE INVENTION

The present invention is therefore a game which combines the teaching skills in, for example, correct sentence punctuation, as well as other disciplines, and was developed primarily for school age children of approximately the fourth through seventh grade levels.

Generally speaking, the game of the present invention consists of a playing board having thereon a designated path along which players move responsive to directions on the reverse side of a set of question cards when an answer is correctly given. The player first reaching the finish point is declared winner, and it is assumed he and the other players will each have improved his punctuation skill or other skills during the course of the game. Although the game is described herein in conjunction with question cards dealing with punctuation, it should be recognized that the question cards could also deal with any other subject, such as history, geography, spelling, etc.

In a preferred embodiment of the present invention, the path of travel around the playing board has a plurality of successive landing areas, each landing area including a plurality of landing areas designated by geometric shapes, each in a different color, and arranged in a row extending transversely to the path of travel. Additionally at several points along the path of travel, one of the geometric shapes in a landing area will be designated as a "chance" position so that a second type of card is selected which gives directions for movement for playing pieces landing in the corresponding area.

The rules of the game are such that a player may move backward of forward, according to the instructions given, to prescribed geometric shapes of selected landing areas. Because of the unique design and rules for playing, a child will also learn how to follow instructions, how to count, and how to identify geometric shapes and colors. Thus players are induced to learn a combination of various language and mathematical skills while enjoying themselves.

It is, therefore, an object of the present invention to provide and educational game to use as a tool for the teaching of children.

It is a further object of the present invention to provide an educational game which combines several subjects.

Still further uses and objects of the present invention will become apparent when the following detailed description is studied in conjunction with the accompanying drawings, in which:

FIG. 1 is a plan view of the playing board according to a preferred embodiment of the present invention;

FIG. 2 is an enlarged plan view of a portion of the playing board illustrated in FIG. 1;

FIG. 3b illustrates the other side, or the answer and instructional side of the representative cards shown in FIG. 3a;

FIG. 5 is a perspective view of a marker used to represent player movement along the designated path on the playing board.

DETAILED DESCRIPTION OF THE PRESENT INVENTION

FIG. 1 illustrates the playing board B according to a preferred embodiment of the present invention. A designated path 20 of travel is provided on the playing surface of board B around which players travel from starting point S to finish point F in accordance with instructions on "question" cards and "chance" cards as will be described hereinafter. The path 20 includes a plurality of successive landing areas 25 winding around the board B.

Figure 3A:
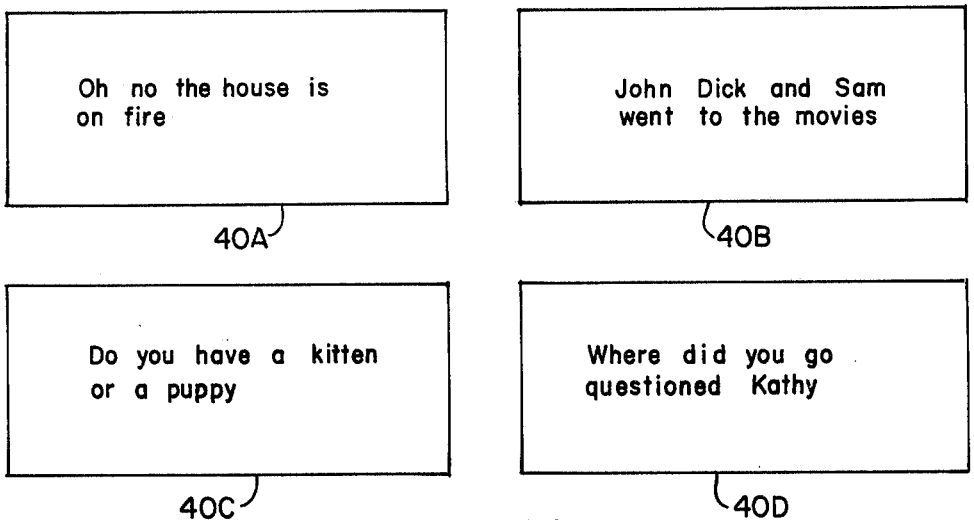
FIG. 3a illustrates one side of a representative selection of several question cards taken from the entire set of question and instructional cards of the present invention.

Each landing area 25 in the preferred embodiment is designated by a row of assorted geometric shapes 30 such as a square, a triangle, a circle, etc., each being of a different color. Referring to FIG. 2, which is illustrative of the game in use as primarily a punctuation teaching device, it can be seen that within the outline of each of these shapes 30, if desired, may appear a punctuation symbol 35 as used in structuring various sentence forms. These symbols 35 correspond to punctuation symbol 35' which are found on the answer and instruction side of each question card in the set of question/instruction cards 40 illustrated in FIGS. 3a and 3b.

Figure 3B:
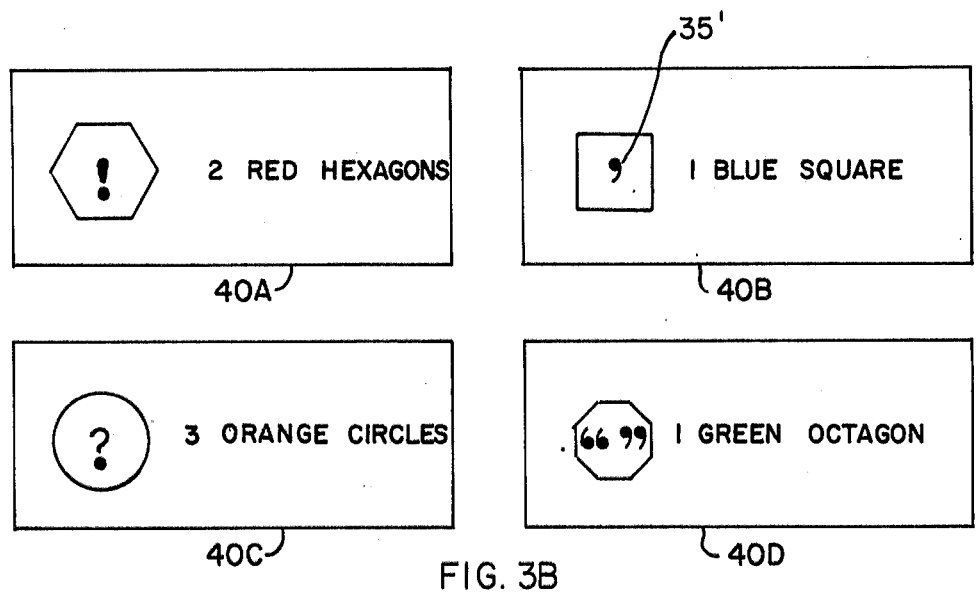

Player progression along path 20 is determined by the aforementioned question/instruction cards 40. During play the question cards 40 are placed in a preferably covered stack, side one up, beside playing board B. Each player in turn draws the top card and reads the sentence on side one (FIG. 3a) inserting the punctuation marks necessary to correctly structure the sentence. After stating the necessary punctuation mark, the player turns the selected card over to determine if he has correctly punctuated the sentence. On the other side of the card the correct answer, or in the illustrated embodiment the correct punctuation symbol 35', appears along with instructions for movement along path 20 assuming the correct answer has been given. For example, question card 40a has a sentence requiring an exclamation point for correct punctuation (FIG. 3a), and the exclamation point is found as symbol 35' on side two (FIG. 3b).

If the player has given the correct answer, he then follows the instructions for movement along path 20 as provided on the reverse side of the cards 40. In the instance of card 40a, the player is instructed to move ahead "two red hexagons." He would then move his marker 60 ahead two rows to the red hexagonal shape.

Figure 4:
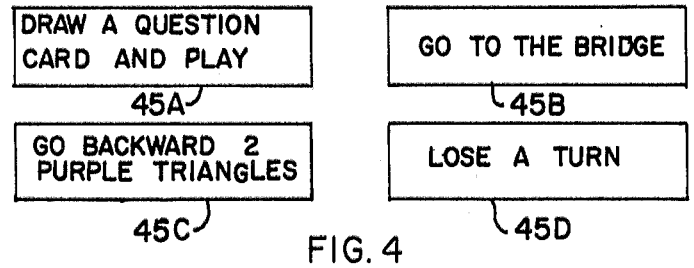
FIG. 4 illustrates a representative selection of "chance" cards according to the present invention.

As a further and additional means for determining player progression along path 20, a series of chance/instruction cards 45 are provided (FIG. 4) at selected positions along the side of path 20. These chance positions 50 are located beside selected rows of landing areas 25 and are designated by a geometrical shape which corresponds to a geometrical shape in the adjacent row of landing points. For example (FIG. 2), alongside the fourth row of landing points 25 from starting point S, a chance designation 50 in the form of a triangle appears. If a player then lands on the corresponding triangle in that fourth row (referred to hereinafter as a "chance designated landing position"), he must draw a chance card 45 and follow the instructions given thereon. Examples of the chance instructions are shown in FIG. 4. Alternatively, the chance cards 45 might be physically located at another area on the board with only the designation 50 appearing beside a selected row.

Using the above-described means, player progression through the game would be as follows. In preparation, the question/instruction cards 40 would be shuffled and placed in a stack, side one up, preferably beneath a cover, near the playing board. The chance instruction cards 45 would be shuffled and stacked at one position or evenly divided among the position points 50 along path 20. Each player would then select a marker 60 and place it on starting point S. Turn of play may be determined randomly or in any other way agreed upon by the players.

The first player then selects the top question card 40, reads and punctuates the sentence on side one and verifies his answer on side two. If he has correctly punctuated the sentence, he moves along path 20 according to instructions given on side two of card 40. If he has incorrectly punctuated the sentence, he does not move ahead; and other players proceed with their turns.

If a player lands on a chance designated landing position in a row corresponding to a chance designation 50, he takes the top card from that group of chance instruction cards 45 and follows the instructions given thereon. Play continues in turn in the above manner until the first player reaching finish point F wins.

It should be understood that neither the use of colored geometrical shapes, nor the designation of any punctuation symbol within the shapes on the playing board is essential to the play of the game according to the present invention. They are used in the preferred embodiment as a means for further developing the skills of color and punctuation symbol identification in players.

As revealed in the above disclosure, the educational game, according to the present invention, serves as an aid to the development of various learning skills as well as developing the skills in the subject matter of the question cards. For instance, children readily learn to identify colors. Reading and following given instructions plays a vital role as well as differentiating between the meanings of "forward" and "backward." Correct counting is important. Various geometrical shapes and their names are presented. Besides introducing and reinforcing all of these necessary components of learning, the game dwells heavily upon one particular subject, as illustrated hereinabove, sentence punctuation problems. Thus children are exposed to a combination of various language and mathematical skills.

While various changes may be made in the detail of the game components, it shall be understood that such changes remain within the scope of the present invention as defined and limited only by the following claims.

What is claimed is:

1. An educational game comprising:
   a. a playing board having thereon a designated path for progressive movement of players, said path comprising a starting point, a finish point and a plurality of successive landing areas therebetween, each landing area including therein a plurality of various landing positions arranged in a predetermined order, each of said landing positions being designated by a distinct geometric shape, said positions arranged in a row extending transversely to said designated path, said predetermined order varying in successive landing areas;
   b. a plurality of question cards one of said cards being utilized during each turn of each player for determining player movement, said question cards having a question on one side and the corresponding answer, as well as directions as to movement in the event of a correct answer on the other side;
   c. a playing piece for each player, said pieces being moved to one of said geometric shapes in a designated row responsive to the directions on said other side of said question cards.

2. The educational game according to claim 1 wherein each of said geometric shapes on said playing board is of a different color.

3. The educational game according to claim 1 wherein at least some of said landing areas include an additional geometric shape positoned in the margin therebeside corresponding to one of said geometric shapes within the corresponding landing area, thereby designating said one geometric shape as a chance designated landing position, and a plurality of change cards having directions thereon for further player movement responsive to the landing of a player piece on one of said chance designated landing positions.

* * * * *